US012760824B2

(12) United States Patent
Marques Barroca et al.

(10) Patent No.: US 12,760,824 B2
(45) Date of Patent: Oct. 13, 2026

(54) FLUID CONNECTION ELEMENT AND ASSEMBLY

(71) Applicant: STAUBLI FAVERGES, Faverges-Seythenex (FR)

(72) Inventors: Serafim Marques Barroca, Albertville (FR); Christophe Durieux, Gilly sur Isere (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 0 days.

(21) Appl. No.: 19/269,993

(22) Filed: Jul. 15, 2025

(65) Prior Publication Data

US 2026/0029076 A1 Jan. 29, 2026

(30) Foreign Application Priority Data

Jul. 24, 2024 (FR) .................................... 2408169

(51) Int. Cl.
*F16L 37/23* (2006.01)

(52) U.S. Cl.
CPC .................................. *F16L 37/23* (2013.01)

(58) Field of Classification Search
CPC . F16L 37/0887; F16L 37/0915; F16L 37/138; F16L 37/23
See application file for complete search history.

(56) References Cited

U.S. PATENT DOCUMENTS

| | | | | |
|---|---|---|---|---|
| 2,708,589 A * | 5/1955 | Masek | F16L 37/23 | 251/149.6 |
| 3,140,072 A * | 7/1964 | Scinto, Jr. | F16L 37/23 | 74/41 |
| 3,367,366 A * | 2/1968 | Klatte | F16L 37/23 | 137/614.05 |
| 3,842,614 A * | 10/1974 | Karcher | F16L 37/23 | 137/614.04 |
| 4,289,164 A * | 9/1981 | Ekman | F16L 37/23 | 137/614.03 |

(Continued)

FOREIGN PATENT DOCUMENTS

| | | |
|---|---|---|
| DE | 102008009616 A1 | 8/2009 |
| EP | 1666783 A1 | 6/2006 |

(Continued)

OTHER PUBLICATIONS

Search Report issued in FR 2408169, dated Jan. 14, 2025.

*Primary Examiner* — Matthew Troutman
*Assistant Examiner* — Fannie Kee
(74) *Attorney, Agent, or Firm* — MARSHALL, GERSTEIN & BORUN LLP

(57) ABSTRACT

A fluid connection element, comprising: a body; a locking ball; a locking ring, movable between a blocking position, blocking the locking ball in a locking position, and a release position, releasing the locking ball; an actuation ball, to drive the locking ring to the release position during coupling; and a maneuvering ring, mounted around the locking ring and comprising an internal radial wall, radially facing the front annular part and whose diameter is less than the diameter of a cylinder coaxial with the body and comprising said actuation ball, the locking ring comprising a radial heel to be driven by the maneuvering ring.

17 Claims, 12 Drawing Sheets

(56) References Cited

U.S. PATENT DOCUMENTS

| | | | | |
|---|---|---|---|---|
| 4,892,117 | A * | 1/1990 | Spalink .................. | F16L 37/23 137/614.03 |
| 2003/0042734 | A1 | 3/2003 | Kuwabara | |
| 2008/0252069 | A1* | 10/2008 | Tiberghien ............. | F16L 37/23 285/81 |
| 2013/0334814 | A1* | 12/2013 | Tiberghien ............. | F16L 37/23 285/399 |
| 2014/0174577 | A1* | 6/2014 | Tiberghien ............. | F16L 37/23 137/798 |
| 2017/0336005 | A1* | 11/2017 | Wada ..................... | F16L 37/23 |

FOREIGN PATENT DOCUMENTS

| | | | |
|---|---|---|---|
| FR | 2992048 | A1 | 12/2013 |
| JP | 202121469 | A | 2/2021 |

* cited by examiner

FLUID CONNECTION ELEMENT AND ASSEMBLY

FIELD

The present invention relates to a fluid connection element and a fluid connection assembly comprising such a fluid connection element.

BACKGROUND

FR2992048A1 describes a fluid connection element including a body, a locking ring, actuation balls, and locking balls. The locking ring allows locking and unlocking of a complementary fluid connection element coupled with the fluid connection element, by means of the locking balls, which are radially movable relative to the body. The locking ring also acts as an operating ring, thanks to the actuation balls, which are movable in an elongated housing of the body. The coupling of the complementary connection element with the fluid connection element begins with the insertion of a flange of the complementary connection element into the fluid connection element. This flange comes into contact with the actuation balls and causes them to displace towards the back of the elongated housing, the actuation balls then driving the locking ring backward. The locking ring creates a radial clearance space, which, when the ring is thus retracted, allows the locking balls to be radially moved from a locking position to a release position, thus allowing the introduction of the complementary connection element, notably its flange.

SUMMARY

For certain severe applications, contaminants may insert themselves between the locking ring and the outer surface of the body, particularly when the locking ring is retracted. This phenomenon can cause, in the medium to long term, difficulties for the displacement of the locking balls and actuation balls and limit the sliding of the locking ring. Also, it is difficult to choose the same material for the locking ring, which is suitable not only for the internal functional parts interacting with the balls and the body for locking and for the external envelope that must be maneuverable by the user.

The aim of the invention is to propose a new fluid connection element that allows for, the choice of material to be facilitated and the risk of contamination introduction to be reduced, without increasing the effort required for coupling.

To this end, the invention relates to a fluid connection element, configured to be coupled with a complementary fluid connection element, the fluid connection element comprising:

- a body, coaxial with a central axis and into which the complementary fluid connection element is fitted during coupling;
- at least one locking ball, movable relative to the body, radially relative to the central axis, between:
- a locking position, wherein said at least one locking ball is capable of locking the complementary fluid connection element fitted into the body, and
- a release position, wherein said at least one locking ball does not oppose the withdrawal of the complementary fluid connection element;
- a locking ring, movable relative to the body along the central axis between:

- a blocking position, wherein said at least one locking ball is blocked in the locking position,
- a release position, wherein said at least one locking ball is free to be moved to the release position;
- at least one actuation ball, received in an elongated housing of the body and configured to be pushed by the complementary fluid connection element along the elongated housing, during coupling with the complementary fluid connection element, so as to axially drive the locking ring from the blocking position to the release position, the diameter of said at least one actuation ball being greater than the diameter of said at least one locking ball, said at least one actuation ball protruding radially outside a front annular part belonging to the body;
- return means, to return the locking ring to the blocking position.

According to the invention:

- the connection element comprises a maneuvering ring, movable relative to the body along the central axis, mounted around the locking ring and comprising an internal radial wall, radially facing the front annular part of the body at the front of the elongated housing, and whose diameter is less than the diameter of a cylinder coaxial with the central axis and comprising said at least one actuation ball; and
- the locking ring comprises a radial heel, to be driven from the blocking position to the release position by the maneuvering ring.

An idea underlying the invention is to provide the locking ring and the maneuvering ring separately rather than a single locking ring as provided by the prior art. This allows the maneuvering ring to have a cylindrical internal wall with a particularly narrow diameter, which limits the risk of contamination introduction. The single ring of the prior art, ensuring both locking and maneuvering, could not easily include such a cylindrical internal wall without generating difficulties for the manufacture and assembly of the connection element. The provision of separate locking and maneuvering rings also advantageously allows the implementation of two different materials. Advantageously, the maneuvering ring can be made of a material suitable for maneuvering by the user, and the locking ring can be made of a material suitable for interaction with the body and the locking and actuation balls. Furthermore, said at least one actuation ball and the corresponding elongated housing allow the effort required for coupling to be limited.

According to other advantageous aspects of the invention, the invention comprises one or more of the following features, taken in isolation or in any technically possible combination:

- The maneuvering ring comprises a median internal wall, receiving the locking ring and located behind the internal radial wall, and a rear internal wall, extending along the central axis between the median internal wall and a rear end of the maneuvering ring and whose diameter is strictly greater than the external diameter of the radial heel.
- The maneuvering ring comprises a cylindrical internal groove, arranged at the front of the median internal wall, with a diameter greater than the diameter of the internal radial wall and adapted to receive said at least one actuation ball when the locking ring is in the release position.
- The external diameter of the front annular part is substantially equal to the diameter of the internal radial wall of the maneuvering ring.

- The return means comprise a spring, which bears on the radial heel and on the body and which returns the locking ring to the blocking position.
- The maneuvering ring and the locking ring comprise stop means by means of which the maneuvering ring is driven backward when the locking ring is displaced from the blocking position to the release position.
- The maneuvering ring comprises a rear internal groove, and the stop means comprise a circlip, interposed between a rear edge of the radial heel and a rear edge of the rear internal groove.
- The maneuvering ring is axially movable relative to the locking ring, between an extreme forward position, wherein a front part of the maneuvering ring protrudes from the body forward, by a first protrusion length, and wherein a return means drives the maneuvering ring to the extreme forward position; and an advanced position, behind the extreme forward position, wherein the maneuvering ring bears against the radial heel of the locking ring and wherein the front part of the maneuvering ring protrudes from the body forward, by a second protrusion length less than the first protrusion length.
- The locking ring comprises a front cylindrical part, with an internal diameter equal to the external diameter of the front annular part of the body, and by means of which the locking ring bears radially on a front bearing belonging to the body and on a rear bearing belonging to the body, in the blocking position and in the release position.
- The front bearing and the rear bearing are axially spaced by a length greater than one-third, preferably greater than half of the internal diameter of the front cylindrical part.
- The locking ring comprises a front face, and during coupling, said at least one actuation ball presses on the front face to axially drive the locking ring to the release position.
- In the uncoupled configuration, the locking ring is in abutment forward against said at least one actuation ball.
- The maneuvering ring and the locking ring are screwed into each other.

The invention also relates to a fluid connection assembly, comprising the fluid connection element as described above and the complementary fluid connection element.

Preferably, the complementary fluid connection element comprises a seal forming an annular bead; and the maneuvering ring comprises a front extremal wall, which is conical and divergent forward, the front extremal wall being configured to come into contact with the annular bead when the fluid connection element is coupled with the complementary fluid connection element, with said at least one locking ball in the locking position.

BRIEF DESCRIPTION OF THE DRAWINGS

The invention will become clearer upon reading the following description, given solely by way of non-limiting example, and made with reference to the drawings wherein.

DETAILED DESCRIPTION

Figure 4:
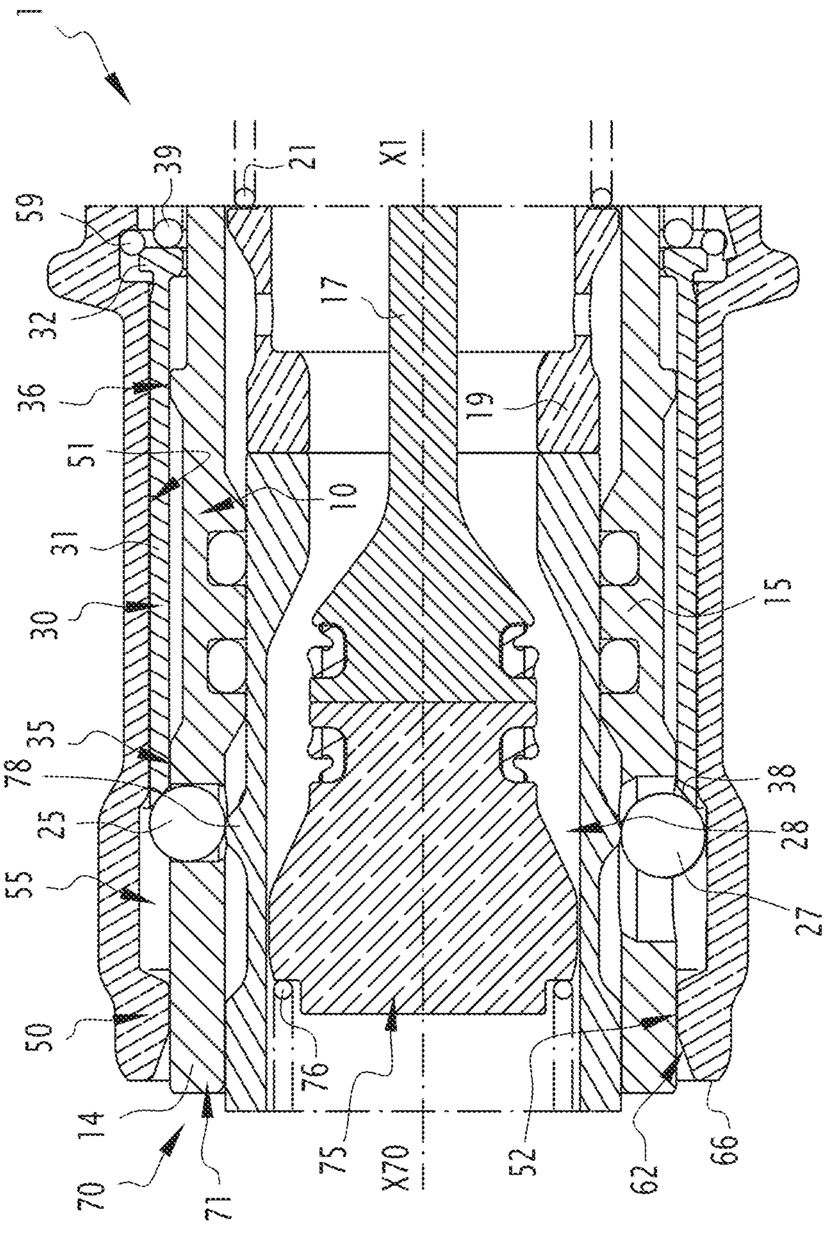
FIG. 4 is a section similar to that of FIG. 3, partial, where the connection assembly is in the process of coupling, with the actuation balls spaced from the central axis.
Figure 5:
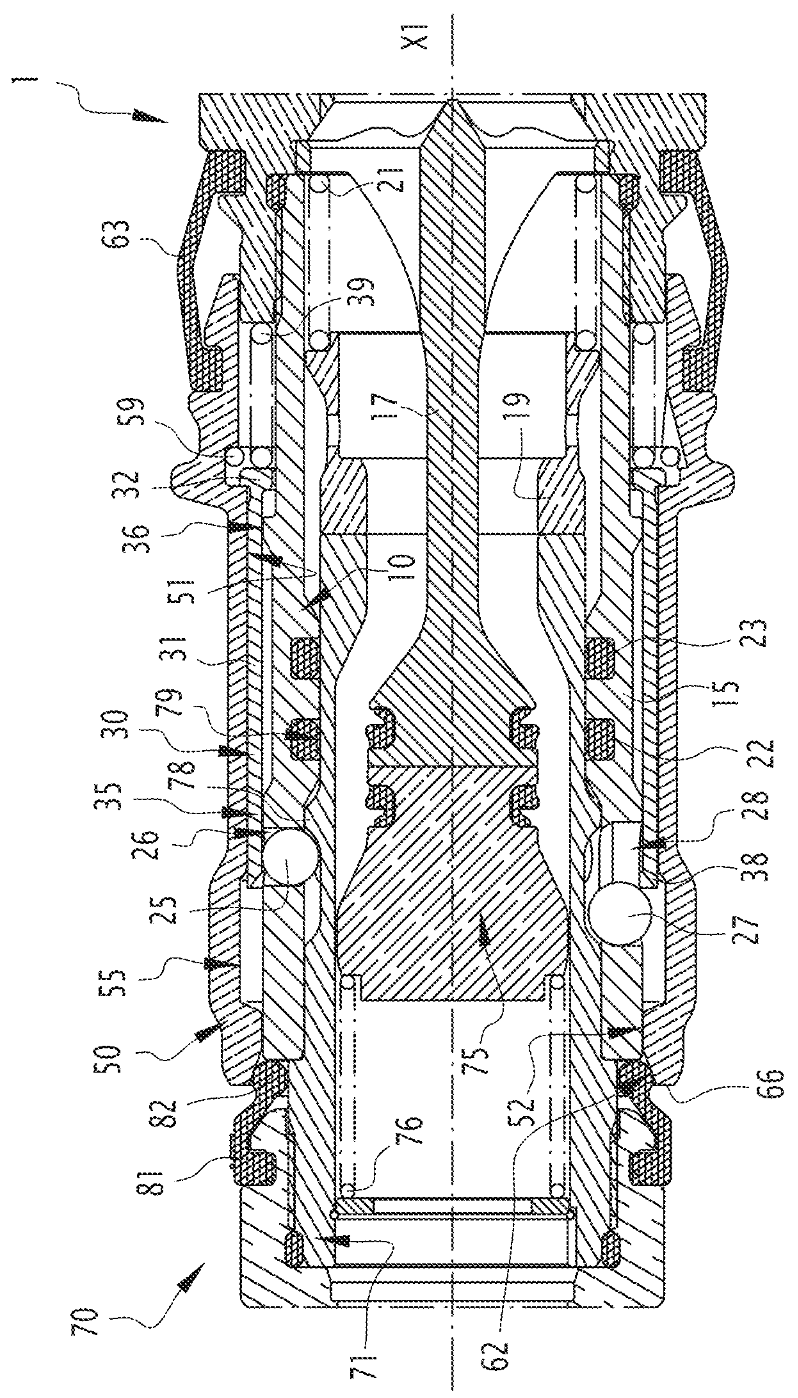
FIG. 5 is a section similar to that of FIG. 4, partial, where the connection assembly is in the process of coupling, with an overtravel maneuvering ring.
Figure 6:
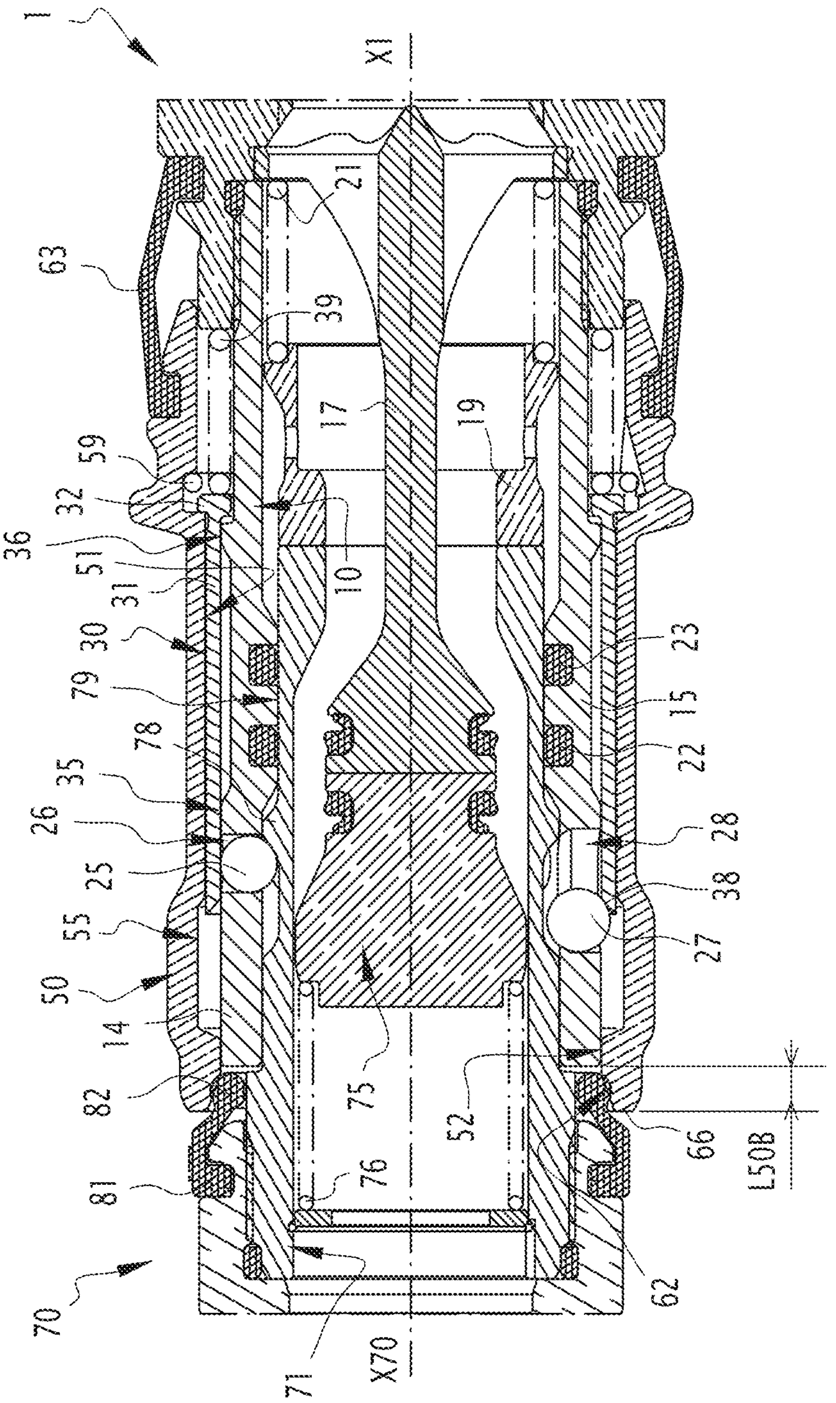
FIG. 6 is a section similar to that of FIG. 5, partial, where the connection assembly is coupled.
Figure 7:
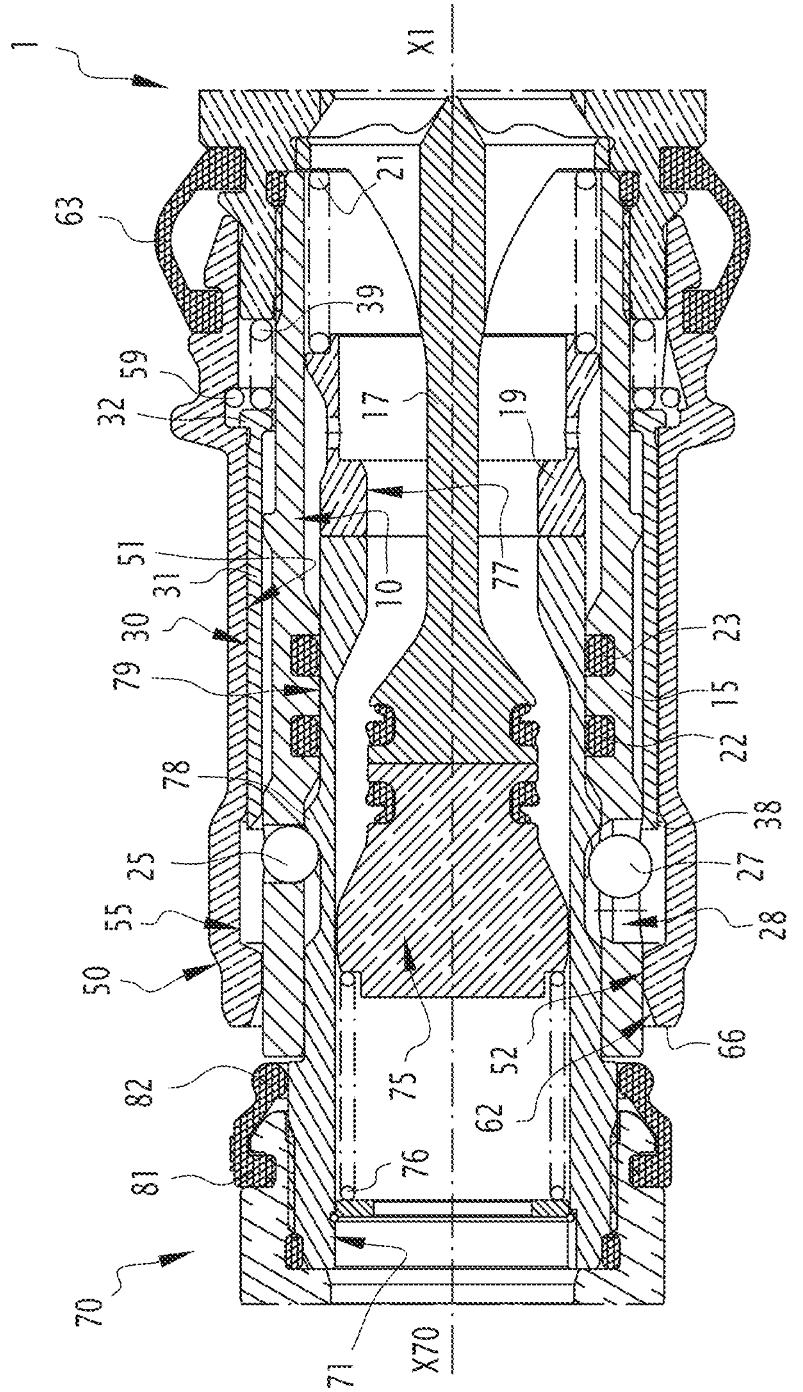
FIG. 7 is a section similar to that of FIG. 6, partial, where the connection assembly is in the process of uncoupling.

FIGS. 1 to 7 show a fluid connection assembly according to a first embodiment of the invention, comprising a fluid connection element 1 and a complementary fluid connection element 70. The fluid connection element 1 is referred to as the "female element," and the element 70 is referred to as the "male element" or "abutment." In FIG. 1, elements 1 and 70 are in an uncoupled configuration and are configured to reach a configuration where elements 1 and 70 are coupled as shown in FIG. 6, after successive steps performed during coupling, as shown chronologically in FIGS. 2 to 5. When elements 1 and 70 are coupled, they are locked in this configuration and must be unlocked to be uncoupled again, as shown in FIG. 7.

Each connection element 1 and 70 defines a central axis, respectively a central axis X1 and a central axis X70, which are configured to be coaxial when elements 1 and 70 are coupled.

A component, face, or direction is defined as "forward" or "distal" for one of the connection elements 1 and 70, as being oriented towards the other connection element 70 or 1 during their coupling. A component, face, or direction is defined as "rear" or "proximal" for one connection element 1 and 70 as being oriented away from the other connection element 70 or 1 during their coupling. An interior component or face is defined as being oriented towards, or as being closer to the central axis X1 or X70 of the respective connection element 1 or 70. An exterior component and an exterior face are defined as being oriented away from, or as being further from, the central axis X1 or X70 of the respective element 1 or 70. An inward direction is defined as being radially oriented towards the central axis X1 or X70 of the respective connection element 1 or 70, and an outward direction as being radially oriented away from the central axis X1 or X70 of the respective element 1 or 70.

The complementary connection element 70 comprises a body 71 coaxial with axis X70, preferably formed by a base body 72 and a rear body 73 screwed to the base body 72. The bodies 71 are tubular along axis X70, thus defining an internal volume open at each end of the body 71, for fluid circulation. At the rear end, the rear body 73 allows mechanical connection to a hose or a fluid passage plate, not shown, for example using an internal thread 74 of the rear body 73. At the front end, the base body 72 forms an open mouth 77.

The complementary connection element 70 comprises a central valve 75, or valve, disposed in the internal volume, in the base body 72. The central valve 75 is movable along axis X70 in the internal volume, between a closed position shown in FIG. 1, where the valve 75 closes the mouth 77 to prevent fluid passage through the internal volume, and an open position shown in FIG. 6, where the central valve 75 has been moved backward relative to the mouth 77, thus allowing fluid passage through the internal volume.

An annular seal 84 is preferably disposed around the central valve 75 to ensure sealing of the closure when the valve 75 is in the closed position, the seal 84 then being radially interposed between the mouth 77 and the central valve 75.

The complementary connection element 70 comprises a spring 76, disposed in the internal volume of the body 71 and pushing the valve 75 towards the closed position by bearing on the body 71.

The body 71, particularly the base body 72, includes an outer radial wall 79 that extends backward from the front end. The body 71, particularly the base body 72, comprises a flange 78, which is formed on the outer radial wall 79 and which radially protrudes outward relative to the outer radial wall 79. The flange 78 comprises a distal wall 80, which is inclined, for example, about 40 degrees, relative to the central axis X70.

The complementary connection element 70 comprises a front annular seal 81, externally carried by the body 71. In particular, the seal 81 is attached to the body in that a rear part of the seal 81 is received in a groove of the rear body 73. The seal 81 also comprises an annular bead 82, in contact with an intermediate cylindrical wall 83 of the body 71, here for example formed by the base body 72, behind the wall 79 and the flange 78.

The connection element 1 comprises a body 10, which extends along the central axis X1. The body 10 is tubular and coaxial with axis X1, so as to define an internal through-passage, open at a front end of the body 10 and at a rear end of the body 10, thus allowing fluid passage inside the body 10, from one end to the other. The body 10 preferably comprises a base body 11, forming the front end, and a rear body 12, forming the rear end and being fixedly attached to the base body 11 by being screwed onto it. The base body 11 is preferably a rotationally symmetric part about axis X1. Preferably, at the rear end, the body 10 is configured to be connected to a hose or a fluid passage plate, not shown. To this end, for example, the rear body 12 includes an internal thread 13.

The body 10, particularly the base body 11, comprises a front annular part 14, comprising the front end of the body 10.

The body 10, particularly the base body 11, comprises a central annular part 15, whose internal diameter is reduced compared to that of the front annular part 14.

The body 10, particularly the base body 11, comprises a rear annular part 16. The central annular part 15 connects the front annular part 14 to the rear annular part 16. Preferably, the rear body 12 is screwed onto the base body 11 by being screwed onto the rear annular part 16, which includes a thread for this purpose.

The front annular part extends along the central axis X1 between the central part 15 and the front end of the body 10. The front annular part 14 has a reduced thickness and contributes to the radially compact dimensions of the connection element 1.

The body 10 advantageously comprises a piston 17, which is arranged inside the internal volume by being advantageously coaxial with axis X1. To be fixedly attached to bodies 11 and 12, the piston 17 preferably comprises a foot 18 axially interposed between bodies 11 and 12. The piston 17 also comprises a head 20, arranged forward relative to the foot 18, at the height of the central annular part 15 of the body 10.

As shown in FIGS. 2 to 7, the body 10 is configured to receive the complementary fluid connection element 70 during coupling and once elements 1 and 70 are coupled. In particular, the body 71 is fitted into the internal volume of the body 10. During coupling and once coupled, the body 71, particularly the base body 72, is arranged radially between the piston 17 and the body 10.

Figure 1:
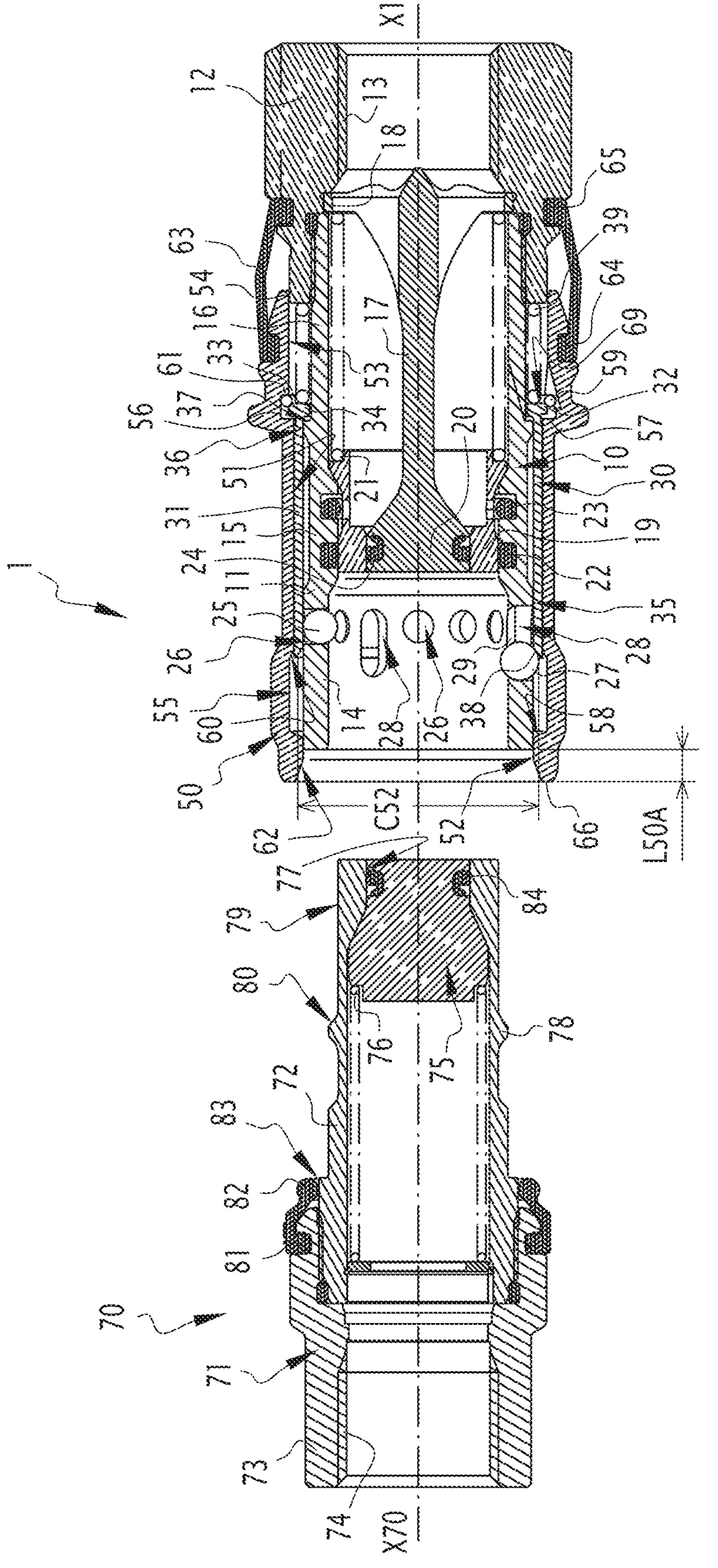
FIG. 1 is a longitudinal section of a connection assembly according to a first embodiment of the invention, comprising a fluid connection element and a complementary fluid connection element and being shown in an uncoupled configuration.

As shown in FIG. 1, the valve 75 is in the closed position when the connection element 70 is in an uncoupled configuration. During coupling with the connection element 1, as shown in FIGS. 1 to 5, the valve 75, initially in the closed position, comes into contact with the head 20 of the piston 17, so that, as the body 71 is moved forward relative to the body 10, the valve 75 is pushed backward in the body 71 by the head 20 until it reaches the open position, against the action of the spring 76.

The connection element 1 comprises an annular slide 19, or valve, which is disposed in the internal volume of the body 10. The slide 19 is movable relative to the body 10 along axis X1, between a closed position shown in FIG. 1, where the slide 19 is arranged at the height of the head 20 of the piston 17 so as to be radially interposed between the body 10 and the head 20, thus closing the internal volume to prevent fluid passage, and an open position shown in FIG. 7, where the slide 19 is behind the head 20, thus freeing the fluid passage through the internal volume of the body 10. In the closed position, the annular slide 19 is preferably in contact forward against the central annular part 15, which forms for this purpose, for example, an internal conical wall on the back of the central annular part 15.

The connection element 1 comprises a spring 21, disposed in the internal volume of the body 10 and pushing the slide 19 towards the closed position by bearing on the body 10.

During coupling, as shown in FIGS. 1 to 5, the slide 19, initially in the closed position, comes into contact with the front end of the body 71, so that, as the body 71 is displaced forward relative to the body 10, the valve 75 is pushed backward in the body 10 by the front end of the body 71 until it reaches the open position, against the action of the spring 21.

Figure 2:
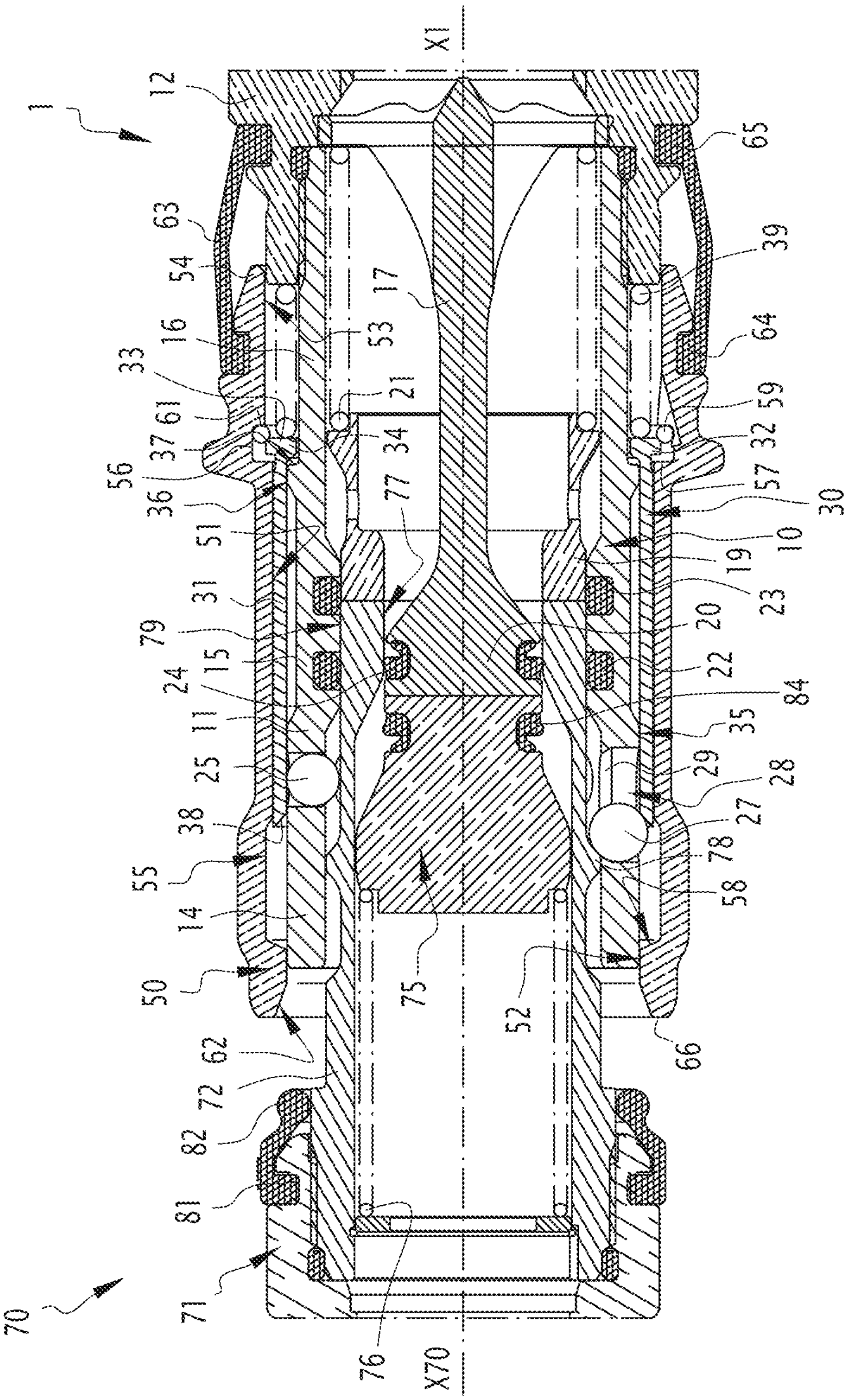
FIG. 2 is a section similar to that of FIG. 1, partial, where the connection assembly is in the process of coupling, at the tipping point towards valve opening.

The central annular part 15 advantageously includes, on the inside, two grooves for housing annular seals 22 and 23. An annular seal 24 is advantageously positioned around the head 20 of the piston 17. When the element 1 is uncoupled, the slide 19 is in the closed position, and is radially interposed between the seal 22 and the seal 24, as shown in FIG. 1. This ensures the sealing of the closure of the internal volume of the body 10. At the beginning of coupling, as the slide 19 is displaced backward away from the closed position, towards the open position, the seal 23, arranged behind the seal 22, takes over from the seal 22 to ensure the sealing of the closure. Seals 22 and 23 thus constitute a pair of seals that advantageously form a double sealing barrier for the fluid connection assembly. As coupling continues, as shown in FIG. 2, the base body 72 fitted into the internal volume of the body 10 and pushing the slide 19 is received by being interposed between seals 22 and 24, the wall 79 in contact with seal 22 and the mouth 77 in contact with seal 24. The body 72 thus takes over from the slide 19 to maintain the internal volume of the closed body 10. Similarly, at the beginning of coupling, as the valve 75 is pushed backward, the seal 24 of the head 20 of the piston 17 comes into contact with the mouth 77 to take over from the seal 84 carried by the valve 75, and thus maintain the internal volume of the closed body 71.

The connection element 1 comprises several locking balls 25, here nine locking balls 25. At least one locking ball 25 is provided. Each locking ball 25 is received in a respective radial housing 26, belonging to the front annular part 14 of the body 10. Each housing 26 passes through the body 10 radially from side to side. Each housing 26 is preferably cylindrical, centered on a radial axis relative to axis X1. Each housing 26 is of the same diameter as the ball 25 it receives. In the illustrated example, where the figures are to scale, the balls 25 have a diameter of 4.5 mm (millimeters).

Each ball 25 is movable relative to the body 10, along a radial axis relative to axis X1, being guided in this movement by the housing 26 that receives it. The movement of the ball 25 takes place between a locking position, shown in FIGS. 1, 2, 5, and 6, and a release position, external to the locking position. The ball 25 is not, however, movable parallel to axis X1 relative to the body 10.

As shown in FIG. 6, when the fluid connection assembly is coupled, each ball 25 is in the locking position to lock the fluid connection element 70 fitted into the body 10, thus maintaining the fluid connection assembly coupled, as explained below. When the fluid connection assembly is coupled and the ball 25 is allowed to be displaced to the release position, the ball 25 does not oppose the withdrawal of the connection element 70 from the body 10, thus allowing the uncoupling of the connection assembly, as explained below.

At its inner end, each housing 26 advantageously includes a diameter reduction, to prevent the ball 25 from being displaced inward to escape from the housing 26 when the connection element 1 is uncoupled.

The connection element 1 comprises several actuation balls 27, here three actuation balls 27. At least one actuation ball 27 is provided. Each actuation ball 27 is received in a respective elongated housing 28, passing radially through the front annular part 14 of the body 10. Each housing 28 passes through the body 10 radially from side to side. Each housing 28 is elongated, i.e., oblong, parallel to axis X1. Thus, each housing 28 has a length, measured parallel to axis X1, which is greater than its width, measured orthoradially relative to axis X1. Over the entire length of the housing 28, the width is equal to the diameter of the ball 27 that this housing 28 receives. In the illustrated example, the balls 27 have a diameter of about 5 mm. The balls 27 have a diameter greater than that of the balls 25.

Preferably, radial housings 26 and 28 are positioned at the same height on the body 10, along axis X1. In particular, housings 26 are positioned at the height of a rear end of housings 28. Preferably, housings 26 and 28 are evenly distributed around axis X1.

Each ball 27 is movable relative to the body 10, along a respective longitudinal axis, parallel to axis X1, being guided in this movement by the housing 28 that receives it. The movement of the ball 27 takes place from the front end to the rear end of the housing 28. Each ball 27 is also movable relative to the body 10, along a respective radial axis, being guided in this movement by the housing 28 that receives it, preferably for any position of the ball 27 relative to the body 10 along axis X1.

At its inner end, each housing 28 advantageously includes a section reduction, to prevent the ball 27 from being displaced inward to escape from the housing 28 when the connection element 1 is uncoupled. The section reduction is advantageously obtained by providing, at the bottom of the elongated housing 28, an inclined wall 29, for example formed by the milling tool that formed the housing 28. The wall 29 is advantageously inclined about 70° relative to an axis that is radial with respect to axis X1 and that passes through the housing 28.

In the unlocked configuration of the connection element 1, the actuation ball 27 is in a forward position relative to the body 10, in abutment against the front end of the housing 28.

The connection element 1 comprises a locking ring 30, which is arranged around the body 10, particularly around the base body 11. The locking ring 30 is movable relative to the body 10 along axis X1. The ring 30 is preferably arranged in front of the rear body 12 for all its positions relative to the body 10. The movement of the ring 30 takes place between a blocking position, shown in FIGS. 1, 2, 5, and 6, and one or more release positions, shown in FIGS. 3, 4, and 7.

The locking ring 30 comprises a radial heel 32 forming the rear end of the ring 30, and, advantageously, a front cylindrical part 31, in front of the radial heel 32.

The internal diameter of the front cylindrical part 31 is equal to, or at least close to, the external diameter of the front annular part 14 of the body 10. The front cylindrical part 31 is then in contact with the front annular part 14, which thus ensures the radial guidance of the locking ring 30 by sliding on the front annular part 14. In other words, the front annular part 14 forms a front bearing 35 belonging to the body 10, on which the locking ring 30 bears, via the front part 31, in the blocking position as in the release position. More precisely, the bearing 35 is formed by a radial surface at the back of the elongated housings 28, whose external diameter is equal to the internal diameter of the front cylindrical part 31. In other words, the ring 30 is always in contact with the front annular part 14 of the body 10 constituting the front bearing 35, regardless of the position of the ring 30 relative to the body 10.

The body 10 also comprises a rear bearing 36, which is formed by a rear flange, protruding from an external radial surface of the central annular part 15. The internal diameter of the front cylindrical part 31 is equal to, or at least close to, the external diameter of the rear flange of the body 10. The front cylindrical part 31 is then in contact with the flange, thus constituting the rear bearing 36 ensuring the radial guidance of the locking ring 30 by sliding on the rear bearing 36. The locking ring 30 bears on the rear bearing 36, via the front part 31, in the blocking position as in the release position. In other words, the ring 30 is always in contact with the bearing 36, regardless of the position of the ring 30 relative to the body 10.

In itself, the provision of two bearings 35 and 36 spaced apart allows optimal guidance of the locking ring 30 and limits the effects of jamming. Preferably, the front bearing 35 and the rear bearing 36 are axially spaced by a length greater than one-third, preferably greater than half of the internal diameter of the front cylindrical part 31.

The radial heel 32 advantageously forms an external ring 33, which protrudes radially outward from the front cylindrical part 31. For example, the external ring 33 measures about 33.8 mm in diameter. The radial heel 32 has an external diameter greater than the diameter of the front cylindrical part 31.

The radial heel 32 advantageously forms an internal ring 34, which protrudes radially inward from the front cylindrical part 31, i.e., having an internal diameter less than that of the cylindrical part 31.

Preferably, the rear flange of the body 10, which already forms the rear bearing 36, also forms the axial stop 37, against which the locking ring 30 comes into abutment forward via the internal ring 34 of the radial heel 32.

Advantageously, the above arrangements make the locking ring 30 not very bulky radially.

At its front end, the locking ring 30 advantageously has a front face 38, preferably in the form of a conical wall centered on axis X1, which is divergent forward. Preferably, the front face 38 is oriented at an angle of about 38 degrees relative to the central axis X1. This front face 38 is referred to as the "actuation slope," since it is through it that the locking ring 30 interacts with the actuation balls 27.

The connection element 1 comprises return means to return the locking ring 30 to the blocking position. Here, the return means are constituted by a spring 39, which is mounted around the body 10, particularly around the base body 11. The spring 39 bears, forward, on the ring 30, particularly on the radial heel 32. The spring 39 bears, backward, on the body 10, particularly on a front wall of the rear body 12. The spring 39, thus interposed between the ring 30 and the body 10, returns the locking ring 30 to the blocking position.

In different configurations of the connection element 1 illustrated in FIGS. 1, 2, 3, 4, and 6, notably in the uncoupled configuration, in the coupled configuration, and at the beginning of coupling, the locking ring 30 is in contact forward against the actuation balls 27 via the front face 38. In these configurations, the front face 38 maintains the actuation balls radially inward, against the inclined wall 29.

In the blocking position, the locking ring 30 blocks the locking balls 25 in the locking position. For this, the locking ring 30, particularly the front cylindrical part 31, covers the housings 26 so as to oppose a displacement of the locking balls 25 to the release position.

In the release position, the locking ring 30 does not oppose the movement of the balls 25 between the blocking position and the release position. For this, the locking ring 30 is retracted backward relative to the housings 26, so as to uncover them at least partially, which leaves room for the balls 25 to displace radially outward. In particular, in the release position, the front face 38 of the front cylindrical part 31 is cleared backward.

The actuation balls 27 protrude radially from the part 14 of the body 10 outward, notably to be able to come into contact backward against the locking ring 30, namely against the front face 38. Preferably, the balls 27 thus protrude in all configurations of the connection element 1, notably the coupled configuration, the uncoupled configuration, and throughout the coupling.

The actuation balls 27 protrude radially from the part 14 of the body 10 inward, to be able to be pushed backward by the distal wall 80 of the flange 78 during coupling. The actuation balls 27 protrude radially from the part 14 of the body 10 inward in the uncoupled configuration, at the beginning of coupling, and in the coupled configuration, as shown in FIGS. 1, 2, 3, 6, and 7.

Figure 3:
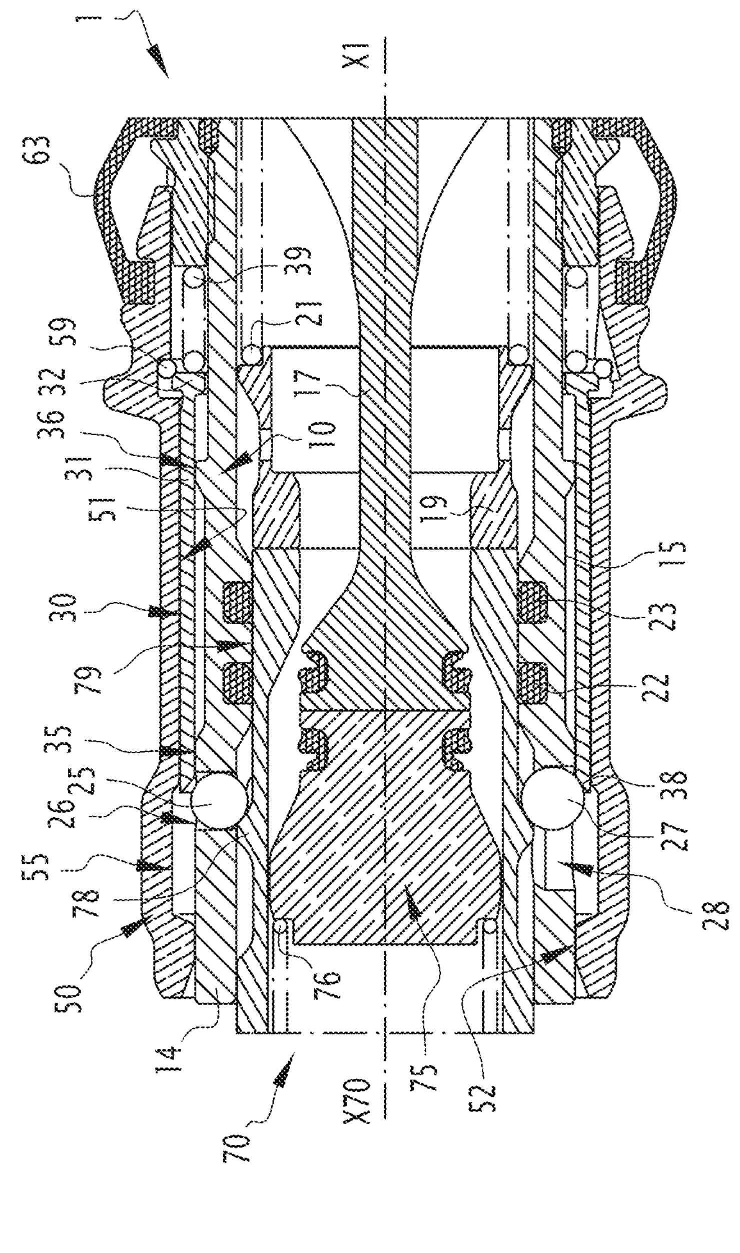
FIG. 3 is a section similar to that of FIG. 2, partial, where the connection assembly is in the process of coupling, with an overtravel maneuvering ring, and open valves.

As shown in FIG. 1, in the uncoupled configuration of the connection where the ball 27 is in the forward position, the actuation ball 27 is axially interposed between the inclined wall 29 of the elongated housing 28 and the front face 38 of the locking ring 30. The presence of the inclined wall 29 then prevents an ejection of the ball 27 inward of the body 10. As shown in FIGS. 2 and 3, during coupling, the distal wall 80 of the flange 78 comes into contact with the actuation ball 27, thus pushing the actuation balls 27 backward along the elongated housing 28. Consequently, the actuation balls 27 are axially interposed between the distal wall 80 of the flange 78 and the front face 38 of the locking ring 30, and in turn push the locking ring 30 from the blocking position to the release position. The distal wall 80 then pushes the balls 27 against the effort applied by the spring 39 on the locking ring 30. In this situation also, the presence of the inclined wall 29 then prevents an ejection of the ball 27 inward of the body 10.

The fact that the balls 27 come into contact with the front face 38 of the locking ring 30 advantageously allows the radial bulk of the locking ring 30 to be limited.

Furthermore, the fact that the locking ring 30 is in contact forward against the balls 27 in the uncoupled configuration implies that the balls 27 are in position to drive the locking ring 30 backward as soon as they come into contact with the flange 78 of the element 70.

The connection element 1 comprises a maneuvering ring 50, arranged around the locking ring 30 and movable relative to the body 10 along the central axis X1. The maneuvering ring 50 is mainly intended to be operated by a user of the connection element 1 to unlock the connection element 1 when the connection element 1 is in the coupled configuration.

The locking ring 30, particularly the front cylindrical part 31, is received in the maneuvering ring 50, particularly in a median internal wall 51 of the maneuvering ring 50.

In this embodiment, the ring 50 is movable not only relative to the body 10 but also relative to the locking ring 30, along axis X1. To this end, the median internal wall 51 is cylindrical with a diameter adjusted to that of the front part 31 of the locking ring 30, so that the rings 30 and 50 slide relative to each other along axis X10, particularly by sliding of the median internal wall 51 around the front part 31.

The maneuvering ring 50 comprises an internal radial wall 52, radially facing the front annular part 14 of the body 10, preferably for any position of the ring 50 relative to the body 10. In other words, the wall 52 is at the height of the front annular part 14 for any position of the ring 50 relative to the body 10. The wall 51 is behind the wall 52.

The internal radial wall 52 has a diameter measured radially to axis X1, for example, 30.5 mm, which is less than the diameter of a cylinder C52, centered on the central axis X1 and comprising the actuation balls 27, i.e., the cylinder C52, centered on the central axis X1, is tangent to the actuation balls 27 on the outside of the body 10. This limits the introduction of contaminants between the ring 50 and the body 10. The cylinder C52 is tangent to the balls 27 and is defined for the balls 27 in the internal radial position, i.e., as they are positioned in the uncoupled configuration of the element 1. For example, the external diameter of the front annular part 14 of the body 10 is about 30 mm. In the present example, the cylinder C52 has a diameter of 31 mm. Whatever the chosen diameters, the wall 52 preferably has a reduced radial clearance with the front annular part 14 of the base body 11. Preferably, the external diameter of the front annular part 14 is substantially equal to the diameter of the internal radial wall 52 of the maneuvering ring 50. By "substantially," it is meant that the external diameter of the part 14 is equal to the diameter of the wall 52, with the presence of a clearance, as small as possible, allowing the sliding of the radial wall 52 along the part 14 along axis X1. The dimensioning of the internal radial wall 52 allows for compact dimensions of the front end of the maneuvering ring 50 and, more generally, allows for radial compact dimensions of the envelope of the connection element 1 on its front part. This dimensioning is advantageous for the bulk and weight of the connection element 1.

In the present example, the internal radial wall 52 is cylindrical and coaxial with axis X1, i.e., it has the same diameter over a certain length. However, "internal radial wall" also covers the case where the wall 52 forms a circular edge centered on axis X1, which is then of a diameter less than the diameter of the cylinder C52.

Alternatively, the maneuvering ring 50 could carry a seal, received in a groove formed in the wall 52, and cooperating with the front annular part 14, to further limit the introduction of contaminants. In this case, it is provided that the edge of the groove, formed by the wall 52, has a diameter less than the diameter of the cylinder C52.

The maneuvering ring 50 advantageously comprises a cylindrical internal groove 55, arranged axially between the internal radial wall 52 and the median internal wall 51. In other words, the groove 55 is behind the wall 52 and in front of the wall 51. At the height of the groove 55, the diameter of the maneuvering ring is greater than that of the walls 51 and 52 and the cylinder C52 and is, for example, 34 mm. The median internal wall 51 has, for example, a diameter of 32 mm, less than the diameter of the groove 55.

As shown in FIG. 4, the groove 55 is configured to receive the actuation balls 27 when the locking ring 30 is in the locking position. In this situation, the actuation balls 27 are in the external radial position relative to the body 10. Also, the locking balls 25 are in the external radial position. Advantageously, the groove 55 is closed by the median internal wall 51 so that the receiving space for the actuation balls 27 and the locking balls 25 is not exposed to external contaminants.

Preferably, the maneuvering ring 50 comprises a rear conical wall 58, divergent backward, which connects the wall 52 to the groove 55. Preferably, the maneuvering ring 50 comprises a front conical wall 60, divergent forward, which connects the groove 55 to the wall 51.

The maneuvering ring 50 advantageously comprises a rear internal groove 56, behind the median wall 51. The rear internal groove 56 has, for example, a diameter of 36 mm.

Behind the groove 56, the maneuvering ring 50 advantageously comprises a rear internal wall 53, which is cylindrical. Along axis X1, the wall 53 extends from the groove 56 to a rear end 54 of the ring 50. The rear internal wall 53 has an external diameter strictly greater than the external diameter of the heel 32 of the locking ring 30, which advantageously allows, during the assembly of the connection element 1, the maneuvering ring 50 to be fitted onto the locking ring 30 from the front, or the locking ring 30 to be fitted into the maneuvering ring 50 from the rear. The wall 53 has, for example, a diameter of 34 mm. The groove 56 advantageously connects the wall 51 to the wall 53. The diameter of the internal radial wall 52 is less than the diameter of the external ring 33 of the radial heel 32, which requires assembly by fitting the maneuvering ring 50 onto the locking ring 30 from the front.

A front edge 57 of the groove 56 preferably forms a front stop surface for the external ring 33 of the heel 32 of the locking ring 30, in the blocking position of the locking ring 30.

The groove 56 advantageously houses a circlip 59, having a cross-section with, for example, a diameter of 1.5 mm. The circlip 59 preferably forms a rear stop surface for the external ring 33 of the heel 32 of the locking ring 30, the circlip 59 itself coming into rear abutment against a rear edge 61 of the groove 56. More precisely, a rear edge 69 of the external ring 33 of the heel 32 comes into contact with the circlip 59, the circlip 59 being interposed between said rear edge 69 of the heel 32 and the rear edge 61. The ring 30 is then captive of the ring 50, in that the heel 32 is axially captured between the front edge 57 and the circlip 59.

More generally, the front edge of the groove 56 and the rear edge 61, with the circlip 59, form stop means for the locking ring 30 in its axial movement forward and backward relative to the maneuvering ring 50. This assembly allows, for example, an axial play of 0.5 mm between the two rings 30 and 50. In doing so, the maneuvering ring 50 is axially movable relative to the locking ring 30 between an extreme forward position, shown in FIGS. 1, 2, 3, and 4, and an advanced position, shown in FIGS. 5, 6, and 7, behind the extreme forward position. In the extreme forward position, the ring 50 is in abutment forward against the ring 30 by abutting the circlip 59 against the heel 32. In the advanced position, the ring 50 is in abutment backward against the ring 30 by abutting the front edge 57 against the heel 32.

By means of these stop means and the external ring 33 of the heel 32, the maneuvering ring 50 is driven backward when the locking ring 30 is displaced from the blocking position to the release position, as shown in FIGS. 3 and 4. Conversely, the locking ring 30 is driven from the blocking position to the release position by the maneuvering ring 50 via the external ring 33 of the heel 32, via said stop means, when the maneuvering ring 50 is driven backward relative to the body 10, as shown in FIG. 7. This displacement of the ring 50 backward is, for example, performed by the user. The implementation of these stop means thus has the effect that the axial movement of the rings 30 and 50 is linked. These stop means also imply that the stop of the maneuvering ring 50 does not need to be performed using the body 10, which advantageously allows that, during the assembly of the connection element 1, the ring 50 can be mounted from the front.

It also results from these stop means that the spring 39 tends to displace the maneuvering ring 50 forward, by means of the locking ring 30, when the heel 32 comes into contact with the front edge 57 of the groove 56. This allows good radial compact dimensions of the connection element 1 to be obtained, since the driving of the ring 50 by the spring 39 is performed indirectly, namely via the ring 30.

Preferably, the connection element 1 also comprises a protective sleeve 63, whose front bead 64 is received in an external groove belonging to the maneuvering ring 50 and whose rear bead 65 is received in a groove belonging to the body 10, notably the rear body 12. The protective sleeve 63 is preferably made of elastomer or plastic material. The protective sleeve 63 is a rotationally symmetric part about axis X1. The sleeve 63 is elastically deformable, for example, like a bellows, so that the bead 64 can displace axially relative to the bead 65. The sleeve 63 thus protects the space between the end 54 of the ring 50 and the body 10 against the introduction of contaminants.

Preferably, the elasticity of the protective sleeve 63 is sufficient for the sleeve 63 to serve as an elastic return means for the maneuvering ring 50, relative to the body 10. The protective sleeve 63 thus returns the maneuvering ring 50 forward relative to the body 10. The sleeve 63 thus tends to drive the ring 50 to the extreme forward position, relative to the locking ring 30.

Preferably, the maneuvering ring 50 comprises a front extremal wall 62, in front of the internal radial wall 52 and behind the front part 66. The front extremal wall 62 is conical and divergent forward. As shown in FIGS. 5 and 6, the front extremal wall 62 comes into contact with the annular bead 82 of the seal 81, at the end of coupling of the fluid connection element 1 with the complementary fluid connection element 70 and when they are coupled, with the balls 25 in the locking position. The seal 81 thus makes the coupled connection assembly airtight to external contaminants likely to enter between the body 71 and the ring 50.

As shown in FIG. 1, in the extreme forward position of the ring 50, a front part 66 of the maneuvering ring 50 protrudes from the body 10, notably from the part 14, forward, by a first protrusion length L50A, measured parallel to axis X1. The front part 66 constitutes the front end of the ring 50, in front of the wall 52 and the front extremal wall 62. In the unlocking configuration, the length L50A is reached.

As shown in FIG. 6, in the advanced position of the ring 50, the front part 66 of the maneuvering ring protrudes from the body 10, notably from the part 14, forward, by a second protrusion length L50B, which is less than the first protrusion length L50A. Preferably, the lengths L50A and L50B are measured for the same position of the locking ring 30, for example, when the locking ring 30 is in the blocking position.

Depending on the distance between the bead 82 and the flange 78 of the connection element 70, the ring 50 takes a position relative to the body 10 between the extreme forward position and the advanced position, when the fluid connection assembly is coupled. In other words, the axial play between the ring 50 and the ring 30 advantageously allows the ring 50 to have a position adapted to the geometric variations of the complementary connection element 70. In the case of FIG. 6, the ring 50 has positioned itself, while for the complementary connection element 70, the bead 82 is closer to the flange 78 than for other complementary connection elements.

Preferably, the ring 50 is made of brass, while the ring 30, the body 10, and the balls 25 and 27 are made of stainless steel.

Alternatively, the spring 39 is removed, and the protective sleeve 63, due to its strong elastic capacity, may suffice to perform the function of return means for the locking ring 30. In other words, in this variant, the protective sleeve 63 is sufficiently elastic to drive the locking ring 30 from the release configuration to the blocking configuration by means of the maneuvering ring 50 and the stop means.

Alternatively, the angle of the distal wall 80 of the flange 78 is greater than the angle of the front face 38 relative to the central axis X1.

Below, a method for coupling the connection assembly described above is described, while it was uncoupled.

As shown in FIG. 2, the element 70 is inserted into the element 1 by the user while the element 1 was in the uncoupled configuration, which first causes the piston 17 to come into contact with the valve 75 and the body 71 to come into contact with the slide 19, so that the valve 75 and the slide 19 begin their displacement backward in the bodies 71 and 10 of their respective elements 70 and 1.

As shown in FIG. 2, the element 70 then comes into contact with the actuation balls 27, which are pushed backward in their elongated housing 28 by the flange 78. Each actuation ball 27 is then wedged between the locking ring 30 and the element 70, precisely between the inclined front face 38, for example, at 38 degrees, and the inclined distal wall 80, for example, at 40 degrees. An effort with a radial inward resultant is thus applied to the balls 27 and guarantees their retention between the element 70 and the locking ring 30 when the element 70 pushes the balls 27. The axial displacement of the actuation balls 27 axially drives the locking ring 30 against the spring 39, which makes the connection element 1 "automatic."

The locking ring 30 pressed by the spring 39 takes up any axial play with the circlip 59 and the rear edge 61 of the maneuvering ring 50. By inserting the element 70, the locking ring 30 drives in its movement the circlip 59, in turn driving the maneuvering ring 50 backward. As the maneuvering ring 50 moves backward, the protective sleeve 63 folds. The radial wall 52 of the maneuvering ring 50, which was facing the front annular part 14, remains facing the front annular part 14, thus limiting the intrusion of dust during operation. Each actuation ball 27 is pushed by the flange 78 backward, without yet being in contact with the rear end of the elongated housing 28 that receives it.

When the flange 78 comes into contact with the locking balls 25, the centers of the locking balls 25 and the actuation balls 27 are substantially radially aligned, apart from geometric differences, knowing that the diameters of the balls 25 and 27 are different. The maneuvering ring 50 is sufficiently driven backward so that the median internal wall 51 is behind the balls 25 and 27, while the groove 55 reaches the height of the balls 25 and 27 along axis X1, offering a radial space for the balls 25 and 27 for their external radial movement. In this configuration, each locking ball 25 has radial play relative to the locking ring 30, and each actuation ball 27 is not yet in contact with the rear end of the elongated housing 28 that receives it. This radial play allows each locking ball 25 to begin its radial outward displacement in its housing 26, by the advancement of the flange 78 of the complementary element 70.

As shown in FIG. 3, the progression of the complementary element 70, and thus that of the locking ring 30, continues, against the efforts produced by springs 21, 39, and 76. When the actuation balls 27 come into contact with the rear end of their respective elongated housing 28, the position reached by the locking ring 30 allows the locking balls 25 to be placed in the release position. This ensures that the locking balls 25 do not act on the backward displacement of the locking ring 30 and limits the effort required by the user for coupling. In this configuration, the locking balls 25, pushed radially outward by the flange 78, protrude radially outside the body 10, particularly outside the part 14. From then on, if the actuation balls 27 were to lose contact with the complementary element 70, the locking ring 30, pushed forward by the spring 39, could not be pushed into a position where the ring 30 could block the actuation balls 27 beyond the flange 78 and where the locking balls 25 would not be in the locking position beyond the abutment flange 78. In other words, it is not possible to pass the actuation balls 27 behind the flange 78 without locking the complementary element 70 with the locking balls 25. This prevents a situation where an unlocked configuration would be reached, not visible to the user.

As shown in FIG. 4, each actuation ball 27 is then guided radially outward by cooperation with the surface of the elongated housing 28 that receives it, under the progression of the complementary element 70, until the actuation ball 27 passes over the flange 78. At the same time, the locking ring 30 continues its backward movement relative to the body 10. Simultaneously, or just before the actuation balls 27 pass over the flange 78, the locking balls 25 let the flange 78 pass. As shown in FIG. 5, the locking ring 30 is pushed forward relative to the body 10 by the spring 39, into the locking position where the ring 30 blocks the locking balls beyond the flange 78. The median internal wall 51 of the maneuvering ring 50 then indirectly covers the locking balls 25, which guides the locking ring 30 and confirms the locking with the locking ring 30.

Throughout the coupling phase, the locking balls 25 have no action on the displacement of the locking ring 30. The coupling is automatic in the sense that the sole insertion action of the user has led to the coupling of the two connection elements 1 and 70. In particular, no additional action is to be initiated by the user to move the locking ring 30 backward.

As shown in FIG. 6, when the connection assembly is coupled, the locking ring 30 is pushed in abutment forward against the actuation balls 27, which do not come into contact with the complementary element 70. Indeed, the locking ring 30 is not in abutment against the rear flange of the bearing 36 while the actuation balls 27 are in contact with the front face 38 of the locking ring and held at the bottom of the elongated housing 28 by the effort of the spring 39. The position of the locking ring 30 relative to the body 10 when the connection assembly is coupled is axially identical to the position of the locking ring 30 in the uncoupled configuration. The maneuvering ring 50 is pushed forward by the protective sleeve 63 and is in airtight contact forward with the annular bead 82 of the seal 81 of the complementary element 70.

Below, a method for uncoupling the connection assembly described above is described, while it was coupled.

For uncoupling, as shown in FIG. 7, the user moves the maneuvering ring 50 backward relative to the body 10. The maneuvering ring 50 thus drives the locking ring 30 from the blocking position to the release position, by abutting the ring 50 backward against the radial heel 32. This also frees a radial space for the locking balls 25 in the groove 55 of the maneuvering ring 50. Also, the actuation balls 27 are pushed by the flange 78 into the groove 55. The user then removes the complementary element 70, which is also pushed by springs 21 and 76. The two elements 1 and 70 are thus separated, i.e., uncoupled.

Figure 8:
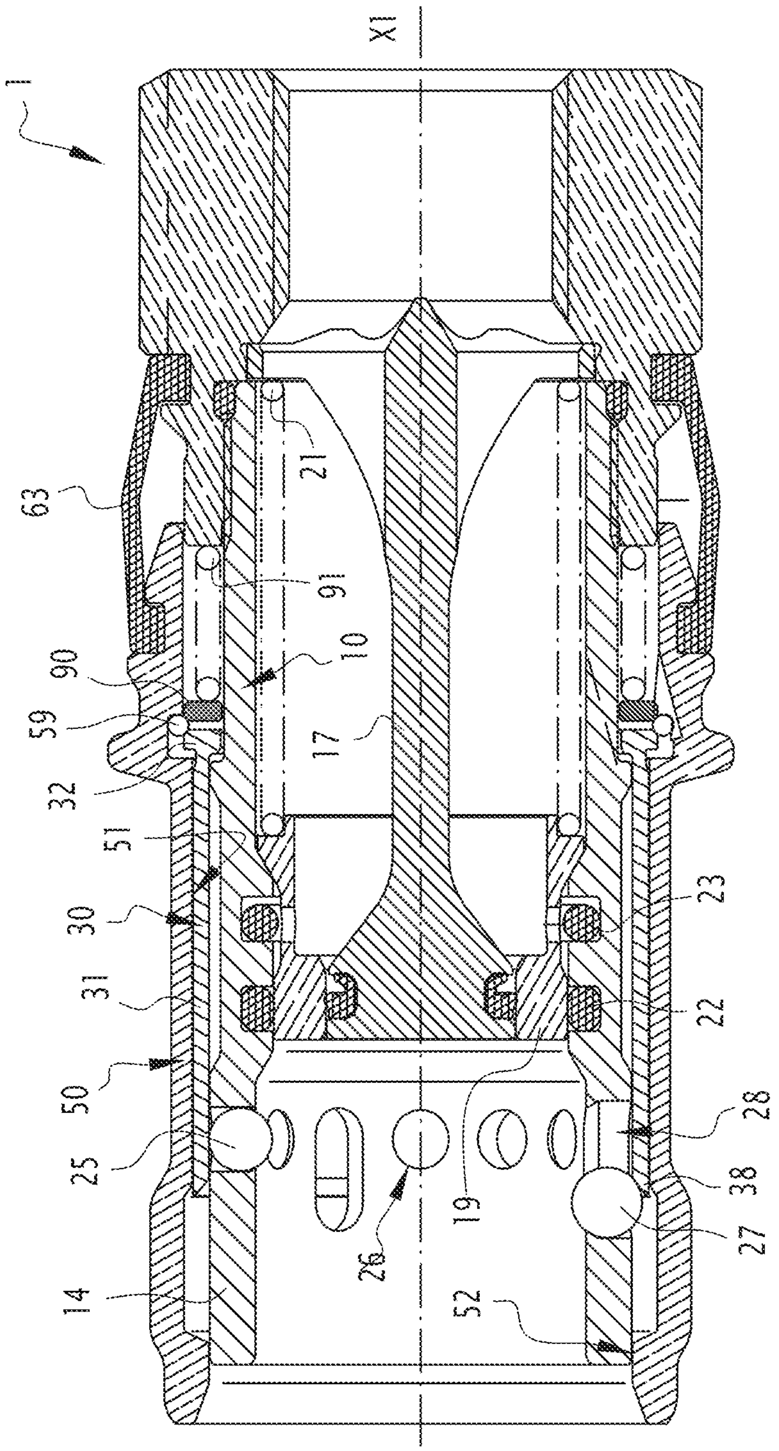
FIG. 8 is a longitudinal section of a connection assembly according to a second embodiment of the invention, comprising a fluid connection element shown in an uncoupled configuration and a complementary fluid connection element, omitted from FIG. 8 but identical to that of FIG. 1.
Figure 9:
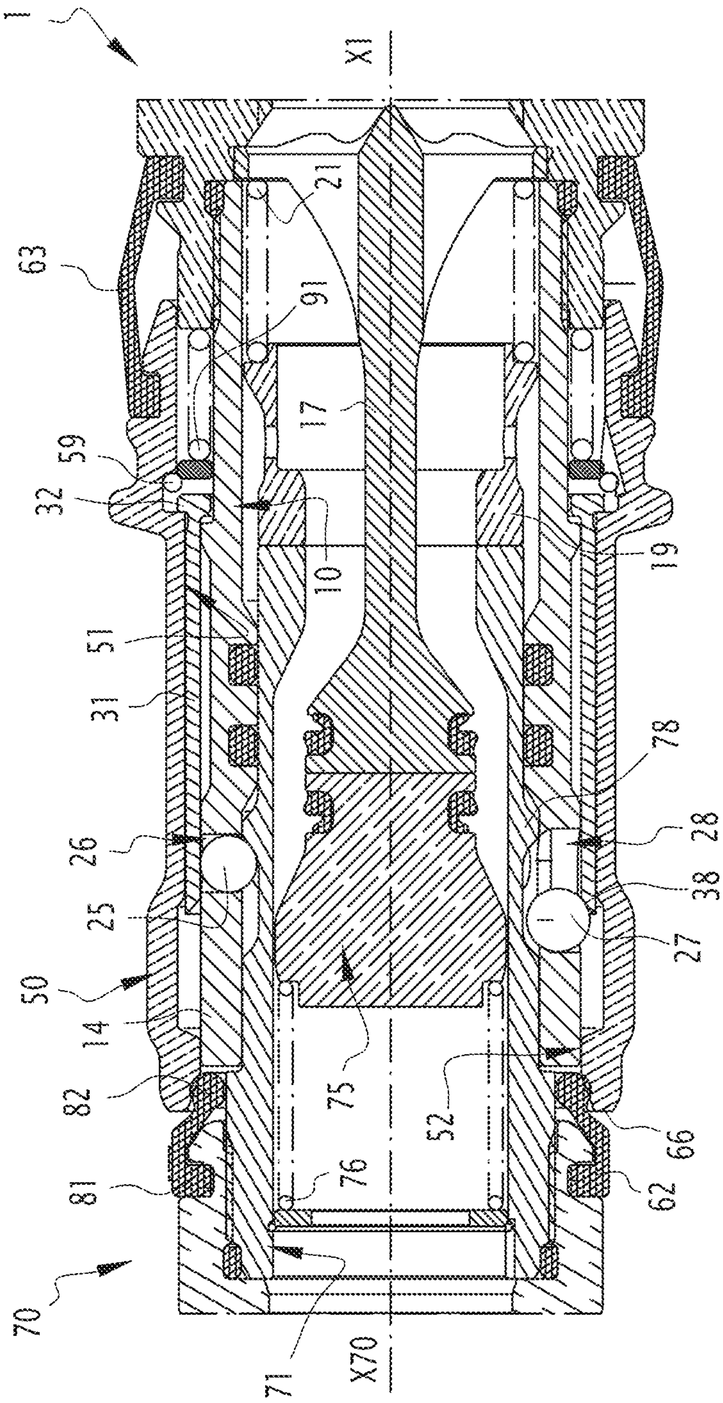
FIG. 9 is a section similar to that of FIG. 8, partial, where the connection assembly is coupled.

FIGS. 8 and 9 show a fluid connection assembly according to a second embodiment, which is identical to that of FIGS. 1 to 7, except that a support ring 90 is interposed radially between the maneuvering ring 50 and the locking ring 30. The support ring 90 is held in contact forward against the back of the circlip 59 under the action of a spring 91, positioned between the support ring 90 and the rear body 12. The spring 91 replaces the spring 39, which is absent in this embodiment. While the spring 39 is a return means to directly return the locking ring 30 to the blocking position, the spring 91 provides an indirect return function, which returns the locking ring 30 to the blocking position by acting by means of the maneuvering ring 50.

Figure 10:
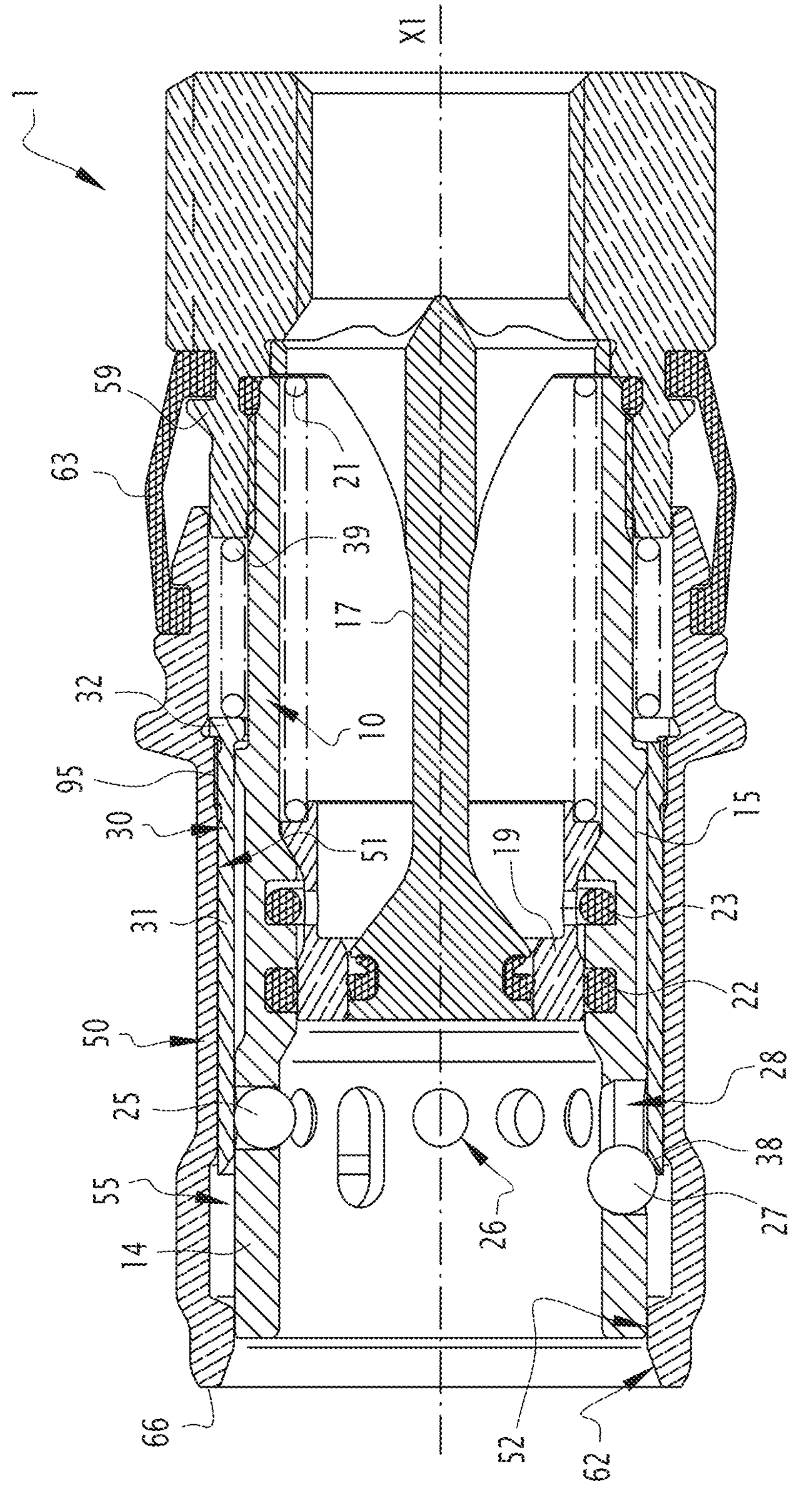
FIG. 10 is a longitudinal section of a connection assembly according to a third embodiment of the invention, comprising a fluid connection element shown in an uncoupled configuration and a complementary fluid connection element, omitted from FIG. 10 but identical to that of FIG. 1.

FIG. 10 shows a fluid connection assembly according to a third embodiment, which is identical to that of FIGS. 1 to 7, except that the locking ring 30 and the maneuvering ring 50 are fixed relative to each other. For this, the locking ring 30 comprises an external thread 95, carried by the front cylindrical part 31, and the median internal wall 51 of the maneuvering ring 50 carries a corresponding thread. The ring 30 is screwed into the ring 50 by screwing the external thread 95 into the thread, so that the ring 50 is always in contact backward against the heel 32 of the ring 30. In this embodiment, the ring 50 remains able to drive the ring 30 backward via the heel 32, being in permanent contact against the heel 32. In this embodiment, the support ring 90 and the circlip 59 are not necessary. In the absence of ring 90 and circlip 59, the dimensions of the rear groove 56 can be reduced, or the rear groove 56 can be removed.

Figure 11:
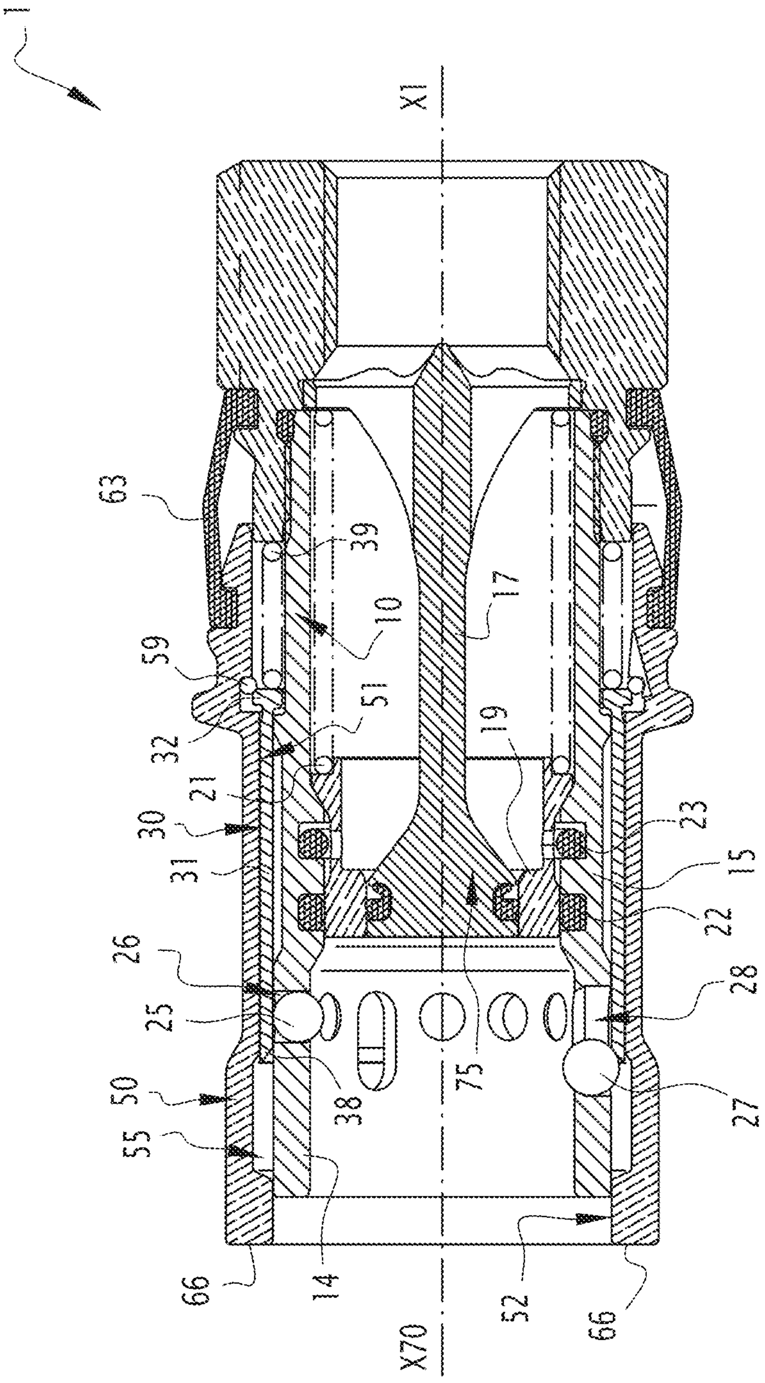
FIG. 11 is a longitudinal section of a connection assembly according to a fourth embodiment of the invention, comprising a fluid connection element shown in an uncoupled configuration and a complementary fluid connection element, omitted from FIG. 11.
Figure 12:
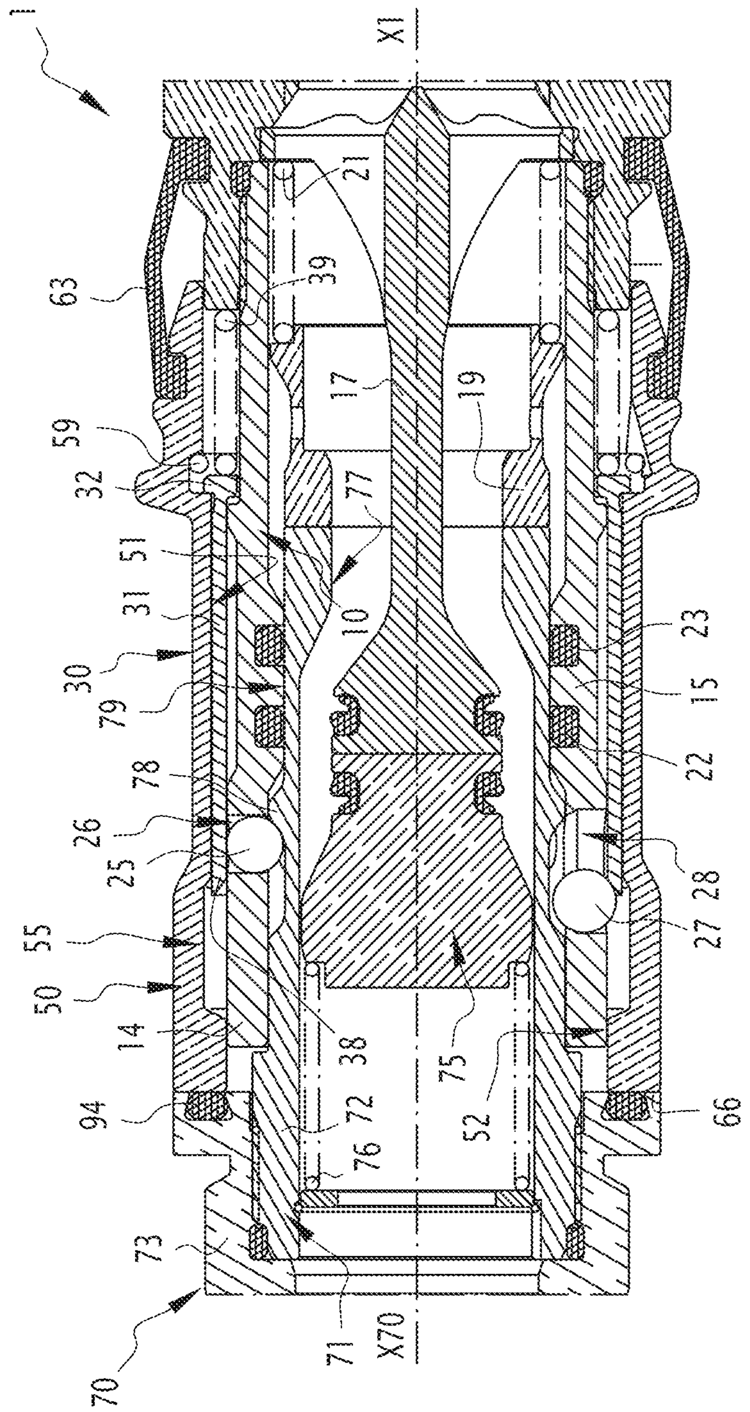
FIG. 12 is a section similar to that of FIG. 11, partial, where the connection assembly is coupled.

FIGS. 11 and 12 show a fluid connection assembly according to a fourth embodiment, which is identical to that of FIGS. 1 to 7, except that the body 71 of the complementary element 70 comprises, instead of the external radial groove of the rear body 73 housing the seal 81, a groove open forward and housing an annular seal 94. The maneuvering ring 50 no longer has the front extremal wall 62, but the front part 66, constituting the front end of the ring 50, here constitutes a front face perpendicular to axis X1, which comes into axial contact forward with the seal 94. The front part 66 is here adjacent to the radial wall 52, since the wall 62 that separated them is absent.

For this embodiment, the fact that the rings 50 and 30 are movable relative to each other remains advantageous, as it allows the coupled connection assembly to guarantee contact between the seal 94 and the ring 50 to maintain the seal between the two elements 1 and 70 at the level of the seal 94, by adapting the position of the ring 50 relative to the ring 30 to adapt to the geometry of the complementary element 70.

Any feature described above for one of the embodiments is applicable to the other embodiments, as long as technically possible.

What is claimed is:

1. A fluid connection element, configured to be coupled with a complementary fluid connection element, the fluid connection element comprising:

a body, coaxial with a central axis and into which the complementary fluid connection element is fitted during coupling;

at least one locking ball, movable relative to the body, radially relative to the central axis, between:

a locking position, wherein said at least one locking ball is capable of locking the complementary fluid connection element fitted into the body, and a release position, wherein said at least one locking ball does not oppose a withdrawal of the complementary fluid connection element;

a locking ring, movable relative to the body along the central axis between:

a blocking position, wherein said at least one locking ball is blocked in the locking position, a release position, wherein said at least one locking ball is free to be moved to the release position;

at least one actuation ball, received in an elongated housing of the body and configured to be pushed by the complementary fluid connection element along the elongated housing, during coupling with the complementary fluid connection element, so as to axially drive the locking ring from the blocking position to the release position, a diameter of said at least one actuation ball being greater than a diameter of said at least one locking ball, said at least one actuation ball protruding radially outside a front annular part belonging to the body;

return means, to return the locking ring to the blocking position; wherein:

the connection element comprises a maneuvering ring, movable relative to the body along the central axis, mounted around the locking ring and comprising an internal radial wall, radially facing the front annular part of the body at a front of the elongated housing, wherein a diameter of the internal radial wall is less than a diameter of a geometric reference cylinder coaxial with the central axis and comprising said at least one actuation ball; and the locking ring comprises a radial heel, to be driven from the blocking position to the release position by the maneuvering ring.

2. The fluid connection element according to claim 1, wherein the maneuvering ring comprises:

a median internal wall, receiving the locking ring and located behind the internal radial wall, and a rear internal wall, extending along the central axis between the median internal wall and a rear end of the maneuvering ring, wherein the diameter of the rear internal wall is greater than an external diameter of the radial heel.

3. The fluid connection element according to claim 2, wherein the maneuvering ring comprises a cylindrical internal groove, arranged at a front of the median internal wall, with a diameter greater than the diameter of the internal radial wall and adapted to receive said at least one actuation ball when the locking ring is in the release position.

4. The fluid connection element according to claim 1, wherein an external diameter of the front annular part is substantially equal to the diameter of the internal radial wall of the maneuvering ring.

5. The fluid connection element according to claim 1, wherein the return means comprise a spring, which bears on the radial heel and on the body and which returns the locking ring to the blocking position.

6. The fluid connection element according to claim 1, wherein the maneuvering ring and the locking ring comprise stop means by means of which the maneuvering ring is driven backward when the locking ring is displaced from the blocking position to the release position.

7. The fluid connection element according to claim 6, wherein:

the maneuvering ring comprises a rear internal groove; and the stop means comprises a circlip, interposed between a rear edge of the radial heel and a rear edge of the rear internal groove.

8. The fluid connection element according to claim 1, wherein the maneuvering ring is axially movable relative to the locking ring, between:

an extreme forward position, wherein a front part of the maneuvering ring protrudes from the body forward, by a first protrusion length and wherein a return means drives the maneuvering ring to the extreme forward position; and an advanced position, behind the extreme forward position, wherein the maneuvering ring bears against the radial heel of the locking ring and wherein the front part of the maneuvering ring protrudes from the body forward, by a second protrusion length less than the first protrusion length.

9. The fluid connection element according to claim 1, wherein the locking ring comprises a front cylindrical part, with an internal diameter equal to an external diameter of the front annular part of the body, and by means of which the locking ring bears radially on a front bearing belonging to the body and on a rear bearing belonging to the body, in the blocking position and in the release position.

10. The fluid connection element according to claim 9, wherein the front bearing and the rear bearing are axially spaced by a length greater than one-third of the internal diameter of the front cylindrical part.

11. The fluid connection element according to claim 10, wherein the front bearing and the rear bearing are axially spaced by a length greater than half of the internal diameter of the front cylindrical part.

12. The fluid connection element according to claim 9, wherein the front bearing and the rear bearing are axially spaced by a length greater than half of the internal diameter of the front cylindrical part.

13. The fluid connection element according to claim 9, wherein:

the locking ring comprises a front face; and during coupling, said at least one actuation ball bears on the front face to axially drive the locking ring to the release position.

14. The fluid connection element according to claim 1, wherein, in an uncoupled configuration, the locking ring is in abutment forward against said at least one actuation ball.

15. The fluid connection element according to claim 1, wherein the maneuvering ring and the locking ring are screwed into each other.

16. A fluid connection assembly, comprising:

the fluid connection element according to claim 1; and the complementary fluid connection element.

17. The fluid connection assembly according to claim 16, wherein:

the complementary fluid connection element comprises a seal forming an annular bead; and the maneuvering ring comprises a front extremal wall, which is conical and divergent forward, the front extremal wall being configured to come into contact with the annular bead, when the fluid connection element is coupled with the complementary fluid connection element, with said at least one locking ball in the locking position.

* * * * *